Patented Dec. 22, 1953

2,663,665

UNITED STATES PATENT OFFICE 2,663,665

N-NAPHTHYL MALEAMIC ESTERS

Waldo B. Ligett, Berkley, Calvin N. Wolf, Ferndale, and Rex D. Closson, Detroit, Mich., assignors to Ethyl Corporation, New York, N. Y., a corporation of Delaware No Drawing. Application April 30, 1951,
Serial No. 223,824

11 Claims.  (Cl. 167—32)

This invention relates to novel maleamic esters. In particular our invention relates to the esters of maleamic acid wherein the amide nitrogen is substituted with a naphthyl radical, thereby providing a class of compounds possessing unusual fungitoxic properties. Our invention also relates to methods of formulating such compounds into useful fungicides and methods for their application.

Various maleamic acids have been produced and disclosed in the prior art wherein the nitrogen of the amide group has been substituted with a variety of organic radicals and wherein various inorganic radicals have replaced one or more of the hydrogen atoms of the unsaturated linkage. Various acid derivatives such as, for example, the metal salts and the organic salts have likewise been prepared in this series. However, these acid derivatives do not possess inherent toxicity to fungus organisms, although certain of such materials have shown limited utility in the general field of pesticidal activity.

It is an object of our invention, therefore, to provide derivatives of maleamic acids which have high utility in the protection of a wide variety of materials from fungus attack. It is a further object of our invention to provide a class of materials which provide protection against a diversity of fungus organisms. It is also an object of our invention to provide a novel class of chemical compounds.

The compounds of our invention comprise the N-naphthyl maleamic acid esters which can be illustrated by the following general formula:

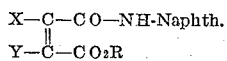

We have made the discovery that by esterifying the carboxylic acid group of N-naphthyl maleamic acids we can provide the property of fungitoxicants to this otherwise ineffective chemical class. This result is entirely unexpected as it is the usual observation in the field of agricultural chemicals that where an active grouping includes a carboxylic acid radical, a wide variety of acid derivatives can be employed without materially changing or affecting the properties of such materials towards susceptible organisms. Our discovery is more surprising in view of the fact that the free acids or salts thereof possess a wider range of solubilities in aqueous solvents than the esters of our invention. However, we have found that in an aqueous system our esters are effective whereas the acids and salt-like derivatives of the acids are ineffective or of extremely limited effectiveness.

In the above general formula for the compounds of our invention we obtain the effective characteristics of our novel fungitoxicants when the group R is alkyl, or a derivative thereof such as, for example, aralkyl, alkenyl and various substitution products thereof, for example, the halogen-, sulfur-, or nitrogen-substituted derivatives. We have found our novel class of compounds retain and in some instances exhibit enhanced activity when the X and Y of the above general formula are the same or different and are chosen from hydrogen, the halogens, sulfhydryl, amino, substituted amino, nitro and nitroso radicals. In the simplest embodiments of our invention we prefer the naphthyl group to be unsubstituted. However, we have found that considerable activity is exhibited by the derivatives wherein the naphthyl radical is substituted with one or more chlorine, amino, nitro or alkyl groups, or a combination thereof.

The choice of the various substituents X, Y, R and the naphthyl substituents depends largely on the type of material being protected by our fungitoxicants, the method of application which is selected and to a lesser degree the particular fungus organisms against which protection is sought. For example, such considerations as solubility, volatility, phytotoxicity, animal toxicity, compatibility with inert carriers, weathering characteristics, staining characteristics of the active ingredient, as well as similar properties of the compositions in which these materials are formulated, and in addition the pour point, fluidity, appearance, etc., all must be considered in choosing a fungicide for commercial application. Thus, provided with the fungitoxic grouping which we have discovered as in the above general formula it is possible to tailor our basic structure to provide a variety of fungitoxicants, each of which has merit for some combination of properties or level of toxicity and is particularly suited to solve the problem at hand.

The following examples of specific embodiments of the compounds of our invention serve to illustrate methods which we employ for manufacturing our materials and will indicate the chemical and physical properties of our novel class of compounds. However, we do not intend that our invention be limited by the specific illustrations herein as other embodiments are clearly within the scope of our invention and other methods for their manufacture will be apparent to those skilled in the art. In the examples

EXAMPLE I

*Methyl ester of N-(α-naphthyl) maleamic acid.*—N-(α-naphthyl) maleamic acid was prepared by adding a solution of 54 parts of α-naphthylamine in 120 parts of benzene into a stirred solution of 37 parts of maleic anhydride in 250 parts of benzene at a temperature of 20° to 25° C. Reaction occurred immediately, and the product separated as a yellow solid. After continuing the stirring for an additional period of 10 to 15 minutes, the product was collected by filtration and dried. The yield of yellow crystals was 90 parts, corresponding to a yield of 99 per cent. This product melted at 138–140° C. In a reaction vessel equipped with a reflux condenser were placed 100 parts of this α-naphthyl maleamic acid, 400 parts of methanol, and 5 parts of p-toluene-sulfonic acid monohydrate. This mixture was boiled under reflux for a period of 20 hours, cooled to a temperature of about 25° C. and added to 300 parts of a 3 per cent aqueous sodium bicarbonate solution. After stirring for 10 minutes, the solid product was collected by filtration, washed with water, and dried. The yield of crude product was 95 parts, corresponding to a yield of 89 per cent. Recrystallization from methanol gave 64 parts of white needles, melting at 126–127° C. This material contained 70.5 per cent carbon, 5.0 per cent hydrogen, and 5.3 per cent nitrogen while the formula $C_{15}H_{13}O_3N$ requires 70.6 per cent carbon, 5.1 per cent hydrogen and 5.5 per cent nitrogen.

EXAMPLE II

*Ethyl ester of N-(α-naphthyl) maleamic acid.*—Using the same process described in Example I, 72.3 parts of N-(α-naphthyl) maleamic acid was treated with 4000 parts of anhydrous ethanol in the presence of a catalytic amount of p-toluenesulfonic acid. The yield of crude product was 575 parts, corresponding to a yield of 71 per cent. After recrystallization from ethanol, the ethyl ester was obtained as colorless needles, melting at a temperature of 119.5 to 120° C.

EXAMPLE III

*n-Butyl ester of N-(α-naphthyl) maleamic acid.*—By the procedure of Example I N-(α-naphthyl) maleamic acid was esterified with n-butyl alcohol to produce the n-butyl ester of N-(α-naphthyl) maleamic acid in 70 per cent yield as a viscous oil.

Similarly, by the procedure of Example I we prepare, for example, the isopropyl, n-octyl, oleyl, benzyl, phytyl, and phenethyl esters of N-naphthyl maleamic acid by treating N-naphthyl maleamic acid with a catalyst such as p-toluenesulfonic acid and isopropanol, n-octyl alcohol, oleyl alcohol, benzyl alcohol, phytyl alcohol and β-phenyl ethanol, respectively.

EXAMPLE IV

*β-Chloroethyl ester of N-(α-naphthyl) maleamic acid.*—To a reaction vessel equipped with a reflux condenser, means for stratifying the reflux liquid, means for removing the condensed water and returning the upper organic liquid phase as recycle to the reactor, were added 70 parts of N-(α-naphthyl) maleamic acid, 200 parts of ethylene chlorohydrin, 180 parts of toluene, and 5 parts of p-toluenesulfonic acid. The mixture was heated at reflux temperature for a period of 15 hours, at which time the removal of water formed in the reaction was substantially complete. The major portion of the toluene and excess ethylene chlorohydrin was removed by distillation, and the crude product was washed with bicarbonate of soda solution and purified essentially as described in Example I.

EXAMPLE V

*β-Nitro-n-butyl ester of N-(α-naphthyl) maleamic acid.*—Following the procedure of Example IV, 2-nitrobutanol-1 was treated with N-(α-naphthyl) maleamic acid and p-toluenesulfonic acid in toluene. The product, the β-nitro-n-butyl ester of N-(α-naphthyl) maleamic acid, was recovered as in the preceding example and purified as in Example I.

Other typical esters of N-(α-naphthyl) maleamic acid include the β-trichloroethyl, β-(N,N-dimethylamino) ethyl, β-ethoxyethyl, β-bromoethyl, p-chlorobenzyl, 2,4-dinitrobenzyl, β-(2,4-dichlorophenoxy) ethyl, and 2-propenyl esters which we prepare as in the foregoing example by employing as the esterifying alcohol β,β,β-trichloroethanol, N,N-dimethyl ethanolamine, the monoethyl ether of ethylene glycol, ethylene bromohydrin, p-chlorobenzyl alcohol, 2,4-dinitrobenzyl alcohol, 2,4-dichlorophenoxy ethanol and allyl alcohol, respectively.

EXAMPLE VI

*Methyl ester of α-chloro-N-(α-naphthyl) maleamic acid.*—α-Chloro-N-(α-naphthyl) maleamic acid was prepared by treating chloromaleic anhydride with α-naphthylamine by the procedure described in Example I for the preparation of N-(α-naphthyl) maleamic acid. A solution of the sodium salt was prepared by treating 48.2 parts of this α-chloro-N-(α-naphthyl) maleamic acid with 8 parts of sodium hydroxide, dissolved in 250 parts of water. This solution was cooled to a temperature of 0° to 5° C. and added to a stirred cooled solution of 34 parts of silver nitrate in 150 parts of water. Stirring was continued for 10 minutes during which period the silver salt of α-chloro-N-(α-naphthyl) maleamic acid separated and was then recovered by filtration, washed with cold water and with ethanol, and then dried. The dry silver salt was suspended in 250 parts of anhydrous ether in a reaction vessel equipped with an agitator, and 14.2 parts of methyl iodide was added in small portions to this suspension over a period of 15 minutes. The mixture was then stirred at 20–25° C. for an additional period of two hours, and the precipitated silver iodide was removed by filtration. The ether solution was extracted with 5 per cent aqueous sodium bicarbonate solution and then with water. After drying in the presence of anhydrous calcium sulfate, the ether and excess methyl iodide were removed by distillation at reduced pressure. The product separated as a residue and was crystallized from ether, yielding 40 parts of white crystalline product which melted at 83–85° C., corresponding to a yield of 78.5 per cent.

EXAMPLE VII

*n-Butyl ester of N-(α-naphthyl)-α-chloromaleamic acid.*—Using essentially the procedure of Example VI, 68.6 parts of the silver salt of α-chloro-N-(α-naphthyl) maleamic acid was treated with 18 parts of n-butyl iodide. After crystallization from hexane, the yield of crystalline product was 24 parts, melting at a temperature of 31–35° C.

In accordance with the foregoing description of the preparation of esters of N-(α-naphthyl) maleamic acid, the corresponding typical esters of α-chloro-N-(α-naphthyl) maleamic acid can be similarly prepared by esterifying this acid with the appropriate alcohol.

Furthermore, esters of other naphthyl maleamic acids can be prepared in accordance with our invention. For example, by any of the foregoing processes we can prepare esters of β-chloro-N-(α-naphthyl) maleamic acid, α-chloro-N-(β-naphthyl) maleamic acid, α,β-dibromo-N-(naphthyl) maleamic acid, α-amino-N-(α-naphthyl) maleamic acid, α-(N,N-dimethylamino)-N-(α-naphthyl) maleamic acid, α-sulfhydryl-N-(α-naphthyl) maleamic acid, α-nitroso-β-chloro-N-(α-naphthyl) maleamic acid, α-nitro-N-(α-naphthyl) maleamic acid, N-(β-naphthyl) maleamic acid, N-(1,4-dichloro-2-naphthyl) maleamic acid, α-chloro-N-(β-nitro-α-naphthyl) maleamic acid, N-(β-methyl-α-naphthyl) maleamic acid, α,β-dibromo-N-(β-chloro-α-naphthyl) maleamic acid, α-sulfhydryl-N-(α-ethyl-β-naphthyl) maleamic acid and N-(α-naphthyl) citraconamic acid. Many other variations of the compounds of our invention will be apparent to those skilled in the art.

The compounds of our invention can be employed as fungicides and for the prevention of the germination of the spores of fungi. One method of applying our fungicides is in the form of a water suspension, wherein a surface active agent has been incorporated in sufficient amount to disperse and suspend the fungicide. Examples of such surface active agents which can be employed in forming dispersions include salts of the alkyl and alkylaryl sulfonates, such as Du Pont MP-189 and Nacconol-NR, alkyl sulfates, such as Dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples' Non-Ionic-218. Still other surface active agents can be employed, the above merely showing a representative list of the more common materials.

The solubility of our N-(naphthyl) maleamic acid esters in organic solvents, furthermore, is such that they can be applied advantageously in the form of solutions in this type of solvent, and for certain applications this method of application is preferred. For example, in treating cloth, leather or other fibrous articles it may be desirable to apply our fungicides dissolved in a volatile solvent. After use the volatile solvent evaporates leaving the fungicide impregnated throughout the surface of the article. Likewise, in applying our fungicides to smooth surfaces, as for example in treating wood surfaces for protection against fungus attack, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for our fungicides we can employ hydrocarbons, such as benzene or toluene; ketones, such as acetone and methylethyl ketone; chlorinated solvents, such as carbon tetrachloride, trichloro- and perchloro-ethylene; and esters, such as ethyl, butyl and amyl acetates; and alcohols, such as ethanol, isopropanol, and amyl alcohols. Among the solvents which we prefer to employ are the Carbitols and Cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

In addition to the above-described methods of wet application of the esters of N-(naphthyl) maleamic acid we can prepare compositions in which our materials are extended in talc, clay or other solid diluents. Such formulations have particular utility in the treatment of seeds, wherein an aqueous application may promote premature germination, or where a solvent application may damage the seed. For certain field crop applications we also prefer a dust formulation wherein a wet application might introduce certain secondary effects which are undesirable. Further specific examples of such typical inert solid carriers which can be employed as diluents in our dust formulations include fuller's earth, Pyrophillite, Attaclay and the Filtrols.

To demonstrate the utility of our N-(naphthyl) maleamic esters as fungicides we determined the concentration at which the germination of 50 per cent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect important agricultural crops. These tests were conducted as follows: 100 parts of the active ingredient was triturated with 1,000 parts of distilled water containing one part of the commercial dispersant Triton X-100. This standard suspension was thereupon further diluted with distilled water and the concentration at which one-half of the fungi contained in a drop of water on a microscope slide were prevented from sporulating was determined. This standard slide-germination method is described and accepted by the Committee on Standardization of Fungicidal Tests of the American Phytopathological Society in "Phytopathology," 33, 627 (1943). In the following table are listed typical results of these determinations and differentiates between our esters and the salt derivatives of the corresponding acids.

Table I

| Compound | Concentration (p. p. m.) to inhibit sporulation 50 percent | |
|---|---|---|
| | A. oleracea | S. fructicola |
| Methyl ester of N-(α-naphthyl) maleamic acid. | Less than 1 | Less than 1. |
| Methyl ester of α-chloro-N-(α-naphthyl) maleamic acid. | do | Do. |
| n-Butyl ester of α-chloro-N-(α naphthyl) maleamic acid. | do | Do. |
| N-(α-naphthyl) maleamic acid diethanolamine salt. | Greater than 1,000. | Greater than 1,000. |

Further demonstration of the utility of our compounds as fungicides has been shown in a more specific manner by determining the minimum amount of the active ingredient required to prevent the sporulation of 95 per cent of the fungus organisms present in a culture medium. This determination was conducted in the same manner as the foregoing. The results of these demonstrations are shown in the accompanying table wherein the formulations were prepared as above, and indicate that our materials are approximately twice as effective as a standard copper fungicide.

Table II

| Compound | Concentration (p. p. m.) to inhibit sporulation 95 percent | |
|---|---|---|
| | A. oleracea | S. fructicola |
| Methyl ester of α-chloro-N-(α-naphthyl) maleamic acid | 11 | 8 |
| n-Butyl ester of α-chloro-N-(α-naphthyl) maleamic acid | 11 | 11 |
| Copper Sulfate (Standard) | 20 | 19 |

Of particular importance in the treatment of agricultural crops against fungus diseases is the susceptibility of the plant to damage by the fungitoxicant employed. Our materials are particularly advantageous in this respect since in a variety of tests we have found no evidence that our materials are toxic to plants or inhibit in any way the normal functioning of the plant or the germination of seeds. We have demonstrated the innocuous nature of our fungitoxicants by dipping the entire leaf of each of corn, soybean, tomato, cucumber and cotton plants in suspensions of our fungicides at concentrations as high as 10,000 p. p. m. and have observed no effect on the so-treated plants or upon the leaves which were dipped. Furthermore, each of these plants was totally sprayed with dispersions of our fungicides in water at a concentration of 10,000 p. p. m. without any effect on the plant. Even when our fungicides are applied as a lanolin paste to the stem of young plants of the above species no adverse effects were noted.

The effectiveness of our fungicides in protecting growing plants from fungus diseases has been demonstrated by control of the Tomato Early Blight. For this purpose a number of young tomato plants were infected with the fungus organism responsible for Tomato Early Blight. One-third of these infected plants were sprayed with a 0.2 per cent aqueous suspension of a typical fungicide of our invention, the n-butyl ester of α-chloro-N-(α-naphthyl) maleamic acid, one-third were sprayed in a like manner with a 0.2 per cent aqueous suspension of the commercial fungicide, zinc dimethyl dithiocarbamate and one-third were left as controls. At the termination of the demonstration, after the full effect of fungus had been produced, the plants sprayed with the n-butyl ester of α-chloro-N-(α-naphthyl) maleamic acid had developed only 3 per cent of the number of disease lesions developed by the controls, while the plants sprayed with zinc dimethyl dithiocarbamate had 31 per cent as many lesions as the control plants. Thus, essentially complete control of Tomato Early Blight was obtained by our material under conditions wherein a commercial fungitoxicant was of only limited effectiveness.

Having described various embodiments of the novel compounds of our invention and pointed out the utility to which they may be applied we do not intend that our invention should be limited to the above specific examples of our compounds or methods of their application or use except as in the appended claims.

We claim:

1. The lower alkyl esters of N-naphthyl maleamic acid.
2. As new compositions of matter, lower aliphatic esters of N-naphthyl maleamic acids.
3. As a new composition of matter, methyl-N-(α-naphthyl)-maleamate.
4. Fungicidal compositions consisting essentially of lower aliphatic esters of N-naphthyl maleamic acids together with an extender.
5. Ethyl ester of N-(α-naphthyl) maleamic acid.
6. n-Butyl ester of N-(α-naphthyl) maleamic acid.
7. β-Chloroethyl ester of N-(α-naphthyl) maleamic acid.
8. β-Nitro-n-butyl ester of N-(α-naphthyl) maleamic acid.
9. A fungicidal composition consisting essentially of lower alkyl esters of N-naphthyl maleamic acid together with an extender.
10. A fungicidal composition consisting essentially of a water suspension of a lower aliphatic ester of N-naphthyl maleamic acid and a surface-active agent.
11. The composition of claim 4 wherein the extender is an inert solid carrier in the form of a dust.

WALDO B. LIGETT.
CALVIN N. WOLF.
REX D. CLOSSON.

References Cited in the file of this patent

Hurd et al.: J. Org. Che., vol. 2 (1937), pp. 314–18.

Anschultz: Liebigs Ann., vol. 461 (1928), pp. 155–91.

Parola et al.: Gazz chim. ital., vol 64 (1934), pp. 919–31.